United States Patent
Yu et al.

(10) Patent No.: US 10,419,710 B2
(45) Date of Patent: Sep. 17, 2019

(54) HDR TELEVISION AND METHOD FOR REGIONALLY DIMMING

(71) Applicant: SHENZHEN SKYWORTH-RGB ELECTRONIC CO., LTD., Shenzhen, Guangdong (CN)

(72) Inventors: Minghuo Yu, Guangdong (CN); Gengxin Dai, Guangdong (CN); Zhaobin Wu, Guangdong (CN); Jian Yang, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/318,701

(22) PCT Filed: Jan. 18, 2017

(86) PCT No.: PCT/CN2017/071591
§ 371 (c)(1),
(2) Date: Jan. 17, 2019

(87) PCT Pub. No.: WO2018/023956
PCT Pub. Date: Feb. 8, 2018

(65) Prior Publication Data
US 2019/0246061 A1     Aug. 8, 2019

(30) Foreign Application Priority Data

Aug. 4, 2016 (CN) .......................... 2016 1 0633376

(51) Int. Cl.
*H04N 5/57* (2006.01)
*H04N 9/31* (2006.01)
*G09G 5/10* (2006.01)

(52) U.S. Cl.
CPC .................. *H04N 5/57* (2013.01); *G09G 5/10* (2013.01); *G09G 2320/064* (2013.01); *G09G 2320/0686* (2013.01); *G09G 2360/16* (2013.01)

(58) Field of Classification Search
CPC .......... H04N 5/57; H04N 5/20; H04N 9/3123; H04N 9/3182; G09G 5/10;
(Continued)

(56) References Cited

U.S. PATENT DOCUMENTS

2014/0320552 A1* 10/2014 Seo ........................ G09G 3/3648
345/690
2015/0371579 A1* 12/2015 Yu ............................ G09G 3/32
345/690

FOREIGN PATENT DOCUMENTS

| CN | 101281734 A | 10/2008 |
| CN | 104332140 A | 2/2015 |
| CN | 104505055 A | 4/2015 |

OTHER PUBLICATIONS

International Search Report of PCT Patent Application No. PCT/CN2017/071591 dated Apr. 25, 2017.

* cited by examiner

*Primary Examiner* — Sherrie Hsia

(57) ABSTRACT

Disclosed an HDR television and a method for regionally dimming, the HDR television including a display screen, an offset calculation module, a constant-current driving and controlling module, a plurality of constant-current driving circuits, a plurality of light bars, an image processing MCU, and a memory; the display screen is divided into a plurality of regions, and the plurality of light bars are respectively distributed in the plurality of display screen regions; the image processing MCU is configured to output a grayscale signal; the offset calculation module is configured to acquire
(Continued)

brightness information of each region of the display screen, calculate a reference offset of each region according to the brightness information of each region, and store the reference offset in the memory; the constant-current driving and controlling module is configured to read the reference offset in the memory.

12 Claims, 3 Drawing Sheets

(58) Field of Classification Search
CPC ....... G09G 2320/064; G09G 2320/066; G09G 2320/0686; G09G 2320/0626; G09G 2320/0276; G09G 2360/16; G09G 2360/144
USPC ......... 348/671, 673, 687–690; 345/617, 204, 345/690, 207
See application file for complete search history.

HDR TELEVISION AND METHOD FOR REGIONALLY DIMMING

TECHNICAL FIELD

The present disclosure relates to the field of television technology, and more particularly relates to a HDR television, as well as a method for regionally dimming applied to the HDR television.

BACKGROUND

In recent years, the development of High-Dynamic Range (HDR) TV technology has once again caused the trend of regionally dimming technology applied on TV. With the user's pursuit, the TV picture quality effect presented to users by using regionally dimming technology has also attracted the attention of TV industry developers.

As the name suggests, regional dimming is separately controlled for each area of the display, that is, each area has its own independent light bar. Due to the inherent properties of the device and the design tolerance, under the same control information of the constant-current MCU, the current that is ultimately output to the light bar exists errors. Even if there is no error in the current, under the same current driving of the ideal state, the brightness of the different light bars will be different due to the difference in the properties of the light bar. That is, when the same brightness signal is given to the same display screen, the brightness at different areas of the display is also different. This character reduces the consistency of the display of the regional dimming television to a certain extent.

SUMMARY

It is a primary object of the present disclosure to provide an HDR television that is intended to improve the consistency of displaying on an HDR television display.

To achieve the above object, the present disclosure proposes an HDR television, the HDR television includes a display screen, an offset calculation module, a constant current drive control module, a plurality of constant-current drive circuits, a plurality of light bars, an image processing MCU, and a memory, the display screen is divided into a plurality of regions, and the plurality of light bars are respectively distributed in the plurality of regions;

the image processing MCU is configured to output a grayscale signal;

the offset calculation module is configured to acquire brightness information of each region of the display screen, calculate a reference offset of each region according to the brightness information of each area, and store the reference offset in the memory;

the constant-current driving control module is configured to read the reference offset in the memory, convert into a multi-channel PWM control signal according to the reference offset and the gray scale signal, respectively driving the plurality of constant-current drive circuits to output different constants current to drive the light bar of the corresponding region and light the display.

Optionally, the image processing MCU respectively outputs a first gray scale signal to each constant-current drive circuit; the offset calculation module acquires a brightness value of each area of the display screen, calculates an intermediate value of the brightness values, calculates an offset corresponding to the first gray signal according to the intermediate value, and calculate a reference offset of each region according to the offset.

Optionally, the first grayscale signal is a grayscale signal corresponding to the maximum grayscale.

Optionally, the offset calculation module acquires a duty ratio of a PWM control signal corresponding to the first grayscale signal, an actual value of the regional brightness, and an intermediate value of the regional brightness;

subtracting the intermediate value from the actual value of the regional brightness, then dividing the subtracting result by the actual value of the regional brightness, then multiplying the dividing result by the duty ratio of the PWM control signal to obtain an offset of the first grayscale signal, and dividing the offset by a grayscale to obtain a reference offset.

Optionally, the offset calculation module is integrated in the image processing MCU.

Optionally, the image processing MCU outputs image data to the display screen, and simultaneously outputs grayscale signals of each region to the constant-current driving and controlling module;

the constant-current driving and controlling module calculates a PWM value according to the grayscale signals, then reads the reference offset, multiplies the reference offset and the grayscale value to obtain a grayscale offset of a corresponding region, adds the grayscale offset to the PWM value to obtain a final PWM control value of the corresponding region, and the constant-current controlling circuit outputs a corresponding constant-current driving current according to the final PWM control value to drive the light bar to emit light.

The present disclosure also provides a regional dimming method for using in an HDR television as described above, the method including the following operations:

outputting a grayscale signal through the image processing MCU;

the offset calculation module is configured to acquire brightness information of each region of the display screen, calculate a reference offset of each region, and store the reference offset in the memory;

reading the reference offset in the memory by the constant-current driving and controlling module, converting into a multi-channel PWM control signal according to the reference offset and the grayscale signal, and respectively driving the plurality of constant-current driving circuits to output different constant-current circuits to drive a light bar of a corresponding region and light the display.

Optionally, the operation of acquiring brightness information of each region of a display screen through the offset calculation module, calculating a reference offset of each region including:

the image processing MCU respectively outputs a first grayscale signal to each constant-current driving circuit; the offset calculation module acquires a brightness value of each region of the display screen, calculates an intermediate value of the brightness values, calculates an offset corresponding to the first grayscale signal according to the intermediate value, and calculates a reference offset of each region according to the offset.

Optionally, the operation of calculating a reference offset of each region according to the offset including:

the offset calculation module acquires a duty ratio of a PWM control signal corresponding to the first grayscale signal, an actual value of the regional brightness, and an intermediate value of the regional brightness; and subtracting the intermediate value from the actual value of the regional brightness, then dividing the subtracting result by the actual value of the regional brightness, then multiplying the dividing result by the duty ratio of the PWM control signal to obtain an offset of the first grayscale signal, and dividing the offset by a grayscale to obtain a reference offset.

Optionally, the operation of reading the reference offset in the memory by the constant-current driving and controlling module, converting into a multi-channel PWM control signal according to the reference offset and the grayscale signal, and respectively driving the plurality of constant-current driving circuits to output different constant-current circuits to drive a light bar of a corresponding region and light the display including:

the image processing MCU outputs image data to the display screen, and simultaneously outputs grayscale signals of each region to the constant-current driving and controlling module; and the constant-current driving and controlling module calculates a PWM value according to the grayscale signals, then reads the reference offset, multiplies the reference offset and the grayscale value corresponding to the grayscale signal to obtain a grayscale offset of a corresponding region, adds the grayscale offset to the PWM value to obtain a final PWM control value of the corresponding region, and the constant-current controlling circuit outputs a corresponding constant-current driving current according to the final PWM control value to drive the light bar to emit light.

Optionally, the first grayscale signal is a grayscale signal corresponding to the maximum grayscale.

Optionally, the offset calculation module is integrated in the image processing MCU.

The technical solution of the present disclosure forms an HDR television set by setting a display screen, an offset calculation module, a constant-current driving and controlling module, a plurality of constant-current driving circuits, a plurality of light bars, an image processing MCU, and a memory, the constant-current driving control module is configured to read the reference offset in the memory, convert into a multi-channel PWM control signal according to the reference offset and the gray scale signal, respectively driving the plurality of constant-current drive circuits to output different constants current to drive the light bar of the corresponding region and light the display. The effect of the light bar itself and the current error of the light bar on the brightness of the light bar is effectively reduced, and the brightness of the display screen is improved.

BRIEF DESCRIPTION OF DRAWINGS

To illustrate the technical scheme of embodiments or exemplary technology of the present application more clearly, a brief description of the drawings to be used in the description of the embodiments or the exemplary technology will be given below. Obviously, the drawings described below are merely some of the embodiments of the application and, for those of ordinary skill in the art, other drawings can be obtained according to the structure shown in these figures without creative work.

DESCRIPTION OF THE REFERENCE NUMERALS

Figure 1:
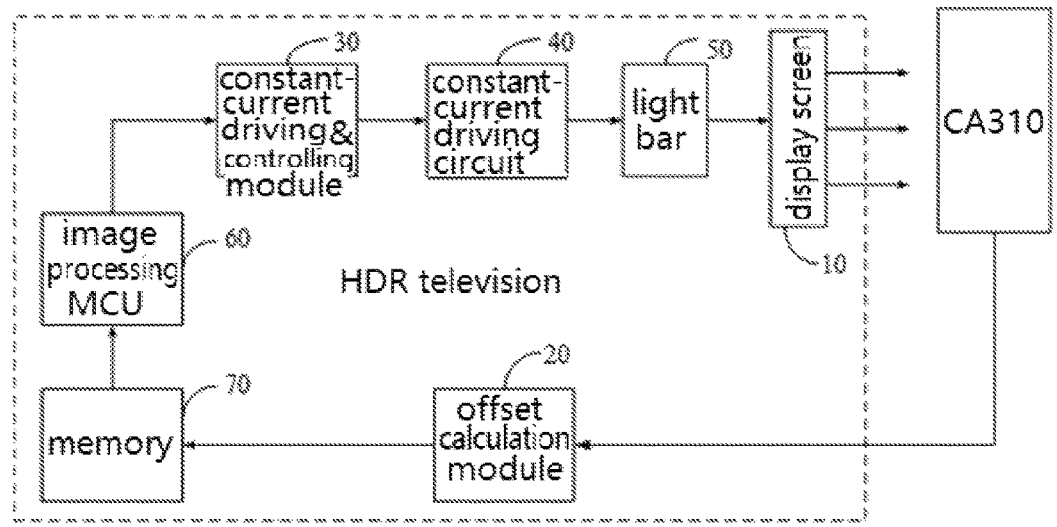
FIG. 1 is a functional block diagram of an HDR television of an embodiment in accordance with this disclosure.

| Label | Name |
| --- | --- |
| 10 | Display screen |
| 20 | Offset calculation module |
| 30 | constant-current driving and controlling module |
| 40 | Constant-current driving circuit |
| 50 | Light bar |
| 60 | Image processing MCU |
| 70 | memory |

Various implementations, functional features, and advantages of this disclosure will now be described in further detail in connection with some illustrative embodiments and the accompanying drawings.

DESCRIPTION OF EMBODIMENTS

The technical schemes in the embodiments of the present application are clearly and completely described in the following embodiments with drawings of the present application. It is obvious that the described embodiments are a part, not all, of the embodiments of the present application. All other embodiments obtained by an ordinary skilled person in the art based on the embodiments of the present application without departing from the inventive scope are fall into the scope of the present application.

It should be noted that all directional indicators (such as "up" "down" "left" "right" "front" or "rear") as merely used to illustrate the relative positions and movements or the like of various components or parts under a specific posture (as depicted in the drawings), and if the specific posture change, these directional indicators will change accordingly.

In addition, the descriptions of "first", "second" and the like in this application are used for descriptive purposes only and are not to be construed as indicating or implying a relative importance or implicitly indicating the number of technical features. Thus, features defined by "first" and "second" may include at least one of the features either explicitly or implicitly. In addition, the technical solutions between the various embodiments may be combined with each other, but must be based on the realization of those skilled in the art, and when the combination of the technical solutions is contradictory or impossible to implement, it should be considered that the combination of the technical solutions does not exist. Nor is it within the scope of protection required by this application.

The present disclosure proposes an HDR television.

Referring to FIG. 1, in the embodiment of the present disclosure, the HDR television includes a display screen 10, an offset calculation module 20, a constant-current driving and controlling module 30, a plurality of constant-current driving circuits 40, a plurality of light bars 50, an image processing MCU 60, and a memory 70; the display screen 10 is divided into a plurality of regions, and the plurality of light bars 50 are respectively distributed in the plurality of display screen regions.

the image processing MCU 60 is configured to output a grayscale signal and an image signal; the offset calculation module 20 is configured to acquire brightness information of each region of the display screen 10, calculate a reference offset of each region according to the brightness information of each region, and store the reference offset in the memory 70; The constant-current driving and controlling module is configured to read the reference offset in the memory 70, convert into a multi-channel PWM control signal according to the reference offset and the gray scale signal, respectively driving the plurality of constant-current drive circuits 40 to output different constant currents to drive the light bar 50 of the corresponding region and light the display screen 10.

With continued reference to FIG. 1, the current supplied to the corresponding constant-current driving circuit 40 is I when the light bar 50 reaches the desired design brightness in accordance with design requirements. Taking the grayscale of 255 (corresponding to hexadecimal 0xFF) as an example, when the image processing MCU 60 outputs a signal with a grayscale of 255, the corresponding current is I; the image processing MCU 60 transmits the corresponding grayscale signal to the constant current driving and controlling module 30 according to the luminance information of each region of the input image. The constant-current driving and controlling module 30 controls the constant-current driving circuit 40 corresponding to each region to output different constant currents according to the grayscale value of each region to drive the light bar 50 of the region to glowing.

It should be noted that, if the constant-current driving current is I, the up-and-down adjustment control of the current should be reserved, for example, to output the PWM signal to the constant current driving circuit 40, and the constant current driving circuit 40 outputs different driving currents according to different PWM duty ratios. When the current is I, the PWM duty cycle should not be designed to be 100%, and when the current is I, the light bar 50 is not its maximum brightness.

In the present disclosure, for each area of the display screen 10, the image processing MCU 60 inputs the maximum grayscale value 0xFF, respectively, and the constant current driving and controlling module 30 controls the regional constant-current driving circuit 40 to output the driving current I, and controls the light bar 50 of the corresponding area. In this embodiment, the brightness of each area of the display screen 10 in the current I state is collected one by one by the color signal tester CA310 externally placed on the television, and the brightness value of the light bar 50 in each area under the same driving current I is obtained. And according to the collected brightness value, the intermediate brightness value is taken as a typical brightness, and the offset calculation module 20 calculates an area brightness larger or smaller than the typical brightness. If the brightness is greater than the typical brightness, the offset is preset negative; if the brightness is less than the typical brightness, the offset is preset positive. Taking the maximum design brightness and the offset as a reference, the offset corresponding to the maximum grayscale level in each region is calculated, and the offset of each grayscale level is calculated according to the offset corresponding to the maximum grayscale level, and finally the offset of each region is obtained. The offset is stored in the memory chip.

When the constant current driving and controlling module 30 outputs a PWM signal during normal operation of the television, the image processing MCU 60 outputs the original image grayscale value and the offset of each region as a reference, and the constant current driving circuit 40 outputs the corrected driving current.

At the same time, for the offset of other grayscales can also be calculated by inputting different grayscale signals and collecting the brightness of the area.

The technical solution of the present disclosure forms an HDR television set by setting a display screen, an offset calculation module, a constant-current driving and controlling module, a plurality of constant-current driving circuits, a plurality of light bars, an image processing MCU, and a memory, forming an HDR TV. The constant-current driving and controlling module 30 is configured to read the reference offset in the memory 70, convert into a multi-channel PWM control signal according to the reference offset and the gray scale signal, respectively driving the plurality of constant-current driving circuits 40 to output different constants current to drive the light bar 50 of the corresponding region and light the display. The effect of the light bar 50 itself and the current error of the light bar 50 on the brightness of the light bar 50 is effectively reduced, and the brightness of the display screen 10 is improved.

Further, the image processing MCU 60 respectively outputs a first grayscale signal to each constant-current driving circuit 40; the offset calculation module 20 acquires a brightness value of each region of the display screen 10, calculates an intermediate value of the brightness values, calculates an offset corresponding to the first grayscale signal according to the intermediate value, and calculates a reference offset of each region according to the offset.

It should be noted, the first grayscale signal is a grayscale signal corresponding to the maximum grayscale. In this embodiment, the maximum grayscale level is 255.

Further, the offset calculation module 20 acquires a duty ratio of a PWM control signal corresponding to the first grayscale signal, an actual value of the regional brightness, and an intermediate value of the regional brightness;

Subtracting the intermediate value from the actual value of the regional brightness, then dividing the subtracting result by the actual value of the regional brightness, then multiplying the dividing result by the duty ratio of the PWM control signal to obtain an offset of the first grayscale signal, and dividing the offset by a grayscale to obtain a reference offset.

Figure 2:
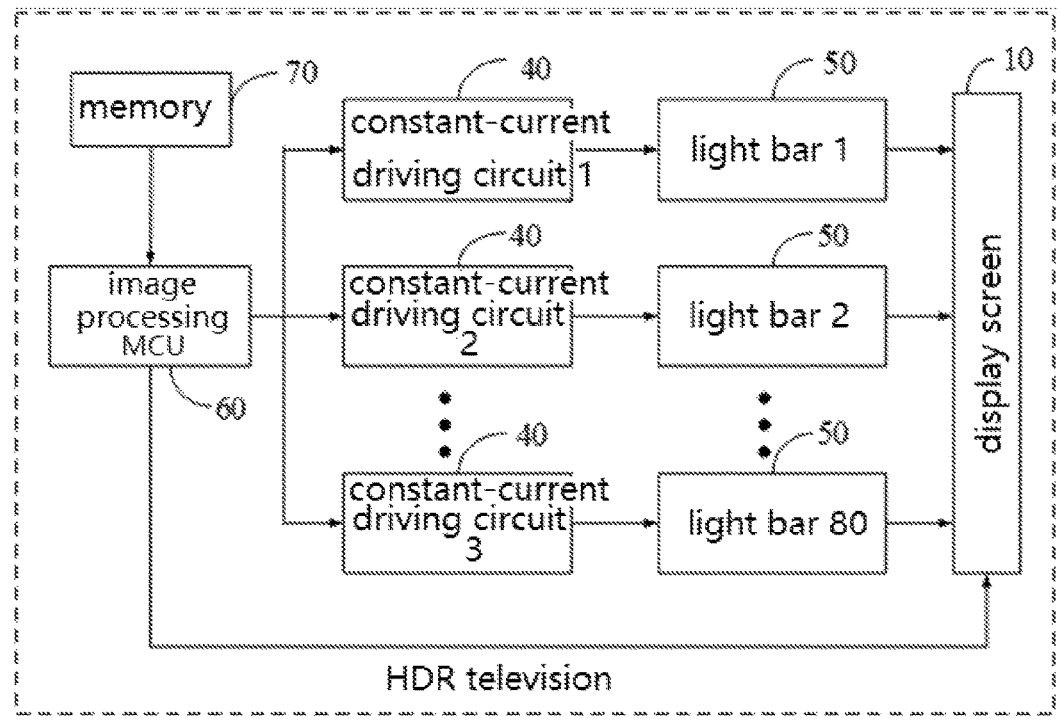
FIG. 2 is a functional block diagram of an HDR television of a further embodiment in accordance with this disclosure.

Referring to FIG. 2, in the embodiment, the display screen 10 of the television is divided into 80 regions, and 10 constant current driving circuits 40 and 80 light bars 50 are correspondingly provided. Each of the constant current driving circuits 40 drives 10 light bars 50.

The maximum grayscale luminance signal input is 0xFF, and the system calculates the offsets of other grayscales according to the offset of the grayscale signal input. The constant-current driving and controlling module 30, the constant current driving circuit 40, and the memory are all disposed on a constant-current plate of the television. The image processing MCU 60 inputs grayscale signals 0xFF to the constant-current driving and controlling module 30, and respectively tests the luminance values of each the region.

That is, the grayscale signal input to the area 1 is 0xFF, and the grayscale signal of the other area is 0x00. At this time, the light bar 50 of the area 1 is emitting, and other areas are not. The luminance L1 of the area 1 at this time is tested and recorded by the color signal tester CA310. The grayscale signal input to area 2 is 0xFF, and the grayscale signal of other areas are 0x00. At this time, the light bar 50 of area 2 is emitting and other areas are not. The color signal tester CA310 is used to test and record the brightness L2 of area 2 at this time. The grayscale signal input to the area 3 is 0xFF, the grayscale signal of other areas is 0x00, at this time, the light bar 50 of the area 3 is illuminated, and the other areas are not, and the brightness L3 of the area 3 is tested and recorded by the color signal tester CA310, until to the area 80. The grayscale signal input to area 80 is 0xFF, and the grayscale signal of other areas are 0x00. At this time, the light bar 50 of area 80 is emitting and other areas are not. The color signal tester CA310 is used to test and record the brightness L80 of area 80 at this time.

After the testing and recording is completed, the offset calculation module 20 calculates the offset of each area, for example, the intermediate value of the brightness is LM, and if the LM is 350 nit, the brightness of a lowest brightness area is 330 nit, and the brightness of a highest brightness area is 380 nit. According to the brightness information of the above testing, for example, the brightness of a certain area is higher than the middle brightness value and the brightness of a certain area is lower than the middle brightness value. The difference between the high brightness area 380 nit and the middle brightness is 30 nit, and the brightness of the area needs to be reduced to 350 nit. The luminance per gray value in this area is 380 nit/255. When the duty ratio of the PWM control signal is 80%, the PWM required to control each gray value is (80%)/255, the brightness is (80%)/380 nit, and the offset PWM corresponding to the gray value 0xFF is ((80%)/380 nit))×30 nit. It can be expressed as:

$$\Delta PWM = PWM \times (LM-L)/L;$$

Where the PWM is the constant-current driving and controlling duty ratio of current I, LM is the intermediate value of brightness of each area of display 10, L is the actual brightness value of a certain area, and $\Delta PWM$ is an offset. When L is 380 nit, the PWM offset $\Delta PWM$ of the bright order 0xFF:

$$\Delta PWM = 80\% \times (350-380)/380 = -6.32\%;$$

The offset corresponding to each grayscale value in this area is:

$$\Delta PWM1 = \Delta PWM/255 \times \text{grayscale};$$

Where $\Delta PWM/255$ can be regarded as a reference offset of the region, and the grayscale value is the offset coefficient; when L is 380 nit, the reference offset $\Delta PWM1$ of the luminance 0xFF is:

$$\Delta PWM/255 = -6.32\%/255 = -0.0248\%$$

Similarly, the PWM offset $\Delta PWM$ of the bright order 0xFF of 330 nit is:

$$\Delta PWM = 80\% \times (350-330)/330 = 4.85\%;$$

The corresponding reference offset is:

$$\Delta PWM/255 = 4.85\%/255 = 0.019\%.$$

According to the luminance data of the above regions and the above formulas, the offset calculation module 20 calculates the reference offset $\Delta PWM/255$ of each region and then generates a constant-current driving offset comparison table 1 (here is 4.85%/255=0.019%). The table 1 is stored in the memory SPI FLASH by a burning tool. Specifically, the offset comparison table includes an ID number, a brightness, and a reference offset of the area, that is, 80 areas in the present example, and the ID is from 1 to 80. In Table 1, only the reference offsets corresponding to three typical luminance are listed, and the reference offsets of ID numbers 2 to 29 and 31 to 79 are omitted.

TABLE 1

| ID number | reference offset | luminance |
|---|---|---|
| 1 | 0.019% | 330 nits |
| ... | ... | ... |
| 30 | 0% | 350 nits |
| ... | ... | ... |
| 80 | −0.0248% | 380 nits |

Further, referring to FIG. 2, the offset calculation module 20 is integrated in the image processing MCU 60. To further reduce the cost, the constant current driving and controlling module 30 is also integrated in the image processing MCU 60.

Further, the image processing MCU 60 outputs image data to the display screen 10, and simultaneously outputs grayscale signals of each region to the constant-current driving and controlling module 30;

the constant-current driving and controlling module 30 calculates a PWM value according to the grayscale signals, then reads the reference offset, multiplies the reference offset and the grayscale value corresponding to the grayscale signal to obtain a grayscale offset of a corresponding region, adds the grayscale offset to the PWM value to obtain a final PWM control value of the corresponding region, and the constant-current controlling circuit outputs a corresponding constant-current driving current according to the final PWM control value to drive the light bar 50 to emit light.

Figure 4:
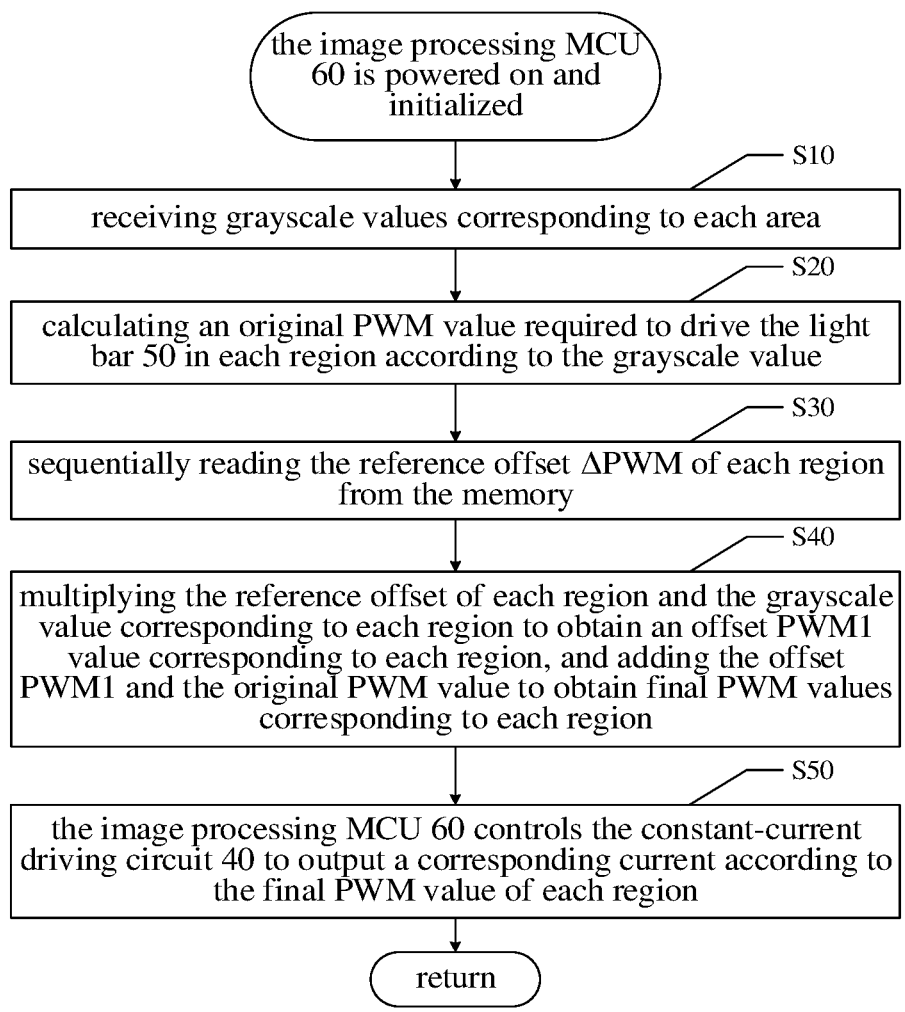
FIG. 4 is a flowchart of a method for regional dimming of an embodiment in accordance with this disclosure.

Referring now to FIG. 2 and FIG. 4, after the TV is powered on, the working-flow of the image processing MCU 60 is further explained:

The main program in the image processing MCU 60 is powered on and initialized;

S10, receiving grayscale values corresponding to each area.

S20, calculating an original PWM value required to drive the light bar 50 in each region according to the grayscale value.

S30, sequentially reading the reference offset $\Delta PWM$ of each region from the memory 70.

S40, multiplying the reference offset of each region and the grayscale value corresponding to each region to obtain an offset PWM1 value corresponding to each region, and adding the offset PWM1 and the original PWM value to obtain final PWM values corresponding to each region.

S50, the image processing MCU 60 controls the constant-current driving circuit 40 to output a corresponding current according to the final PWM value of each region.

Finally, the main program returns.

The technical solution of the present application calculates a grayscale offset of the display screen 10, and then adds the grayscale offset to the original PWM value to obtain the corrected PWM control signal, thereby adjusting the output current of the constant-current driving circuit 40, and improving the consistency of display brightness of display screen 10.

Figure 3:
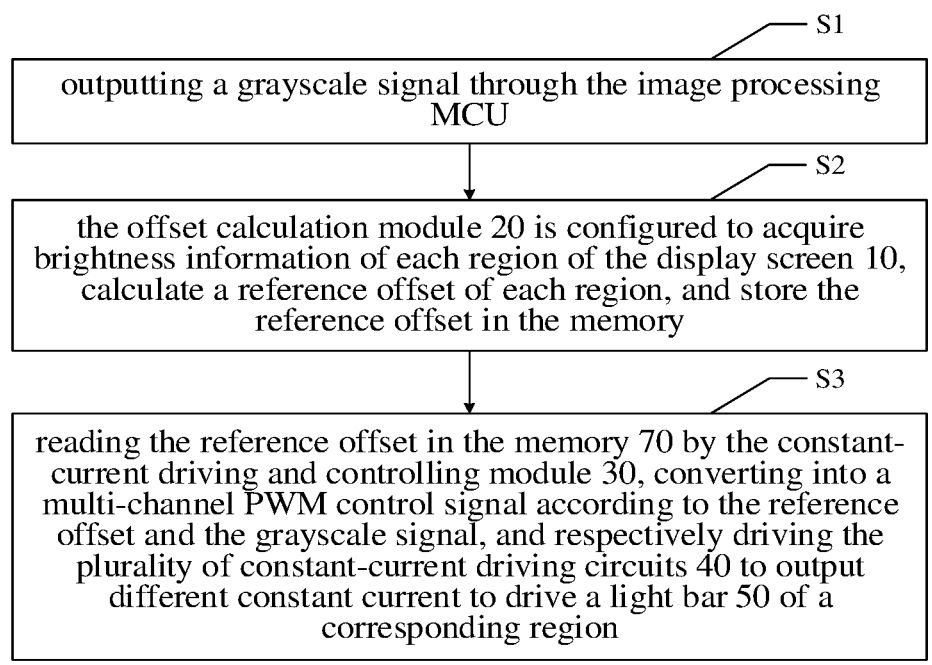
FIG. 3 is an operation flow chart of the image processing MCU after power-on in accordance with this disclosure.

Refer to the FIG. 3, the present disclosure also provides a regional dimming method for using in an HDR television as described above, the method including the following operations:

S1, outputting a grayscale signal through the image processing MCU 60;

S2, the offset calculation module 20 is configured to acquire brightness information of each region of the display screen 10, calculate a reference offset of each region, and store the reference offset in the memory 70;

S3, reading the reference offset in the memory 70 by the constant-current driving and controlling module 30, converting into a multi-channel PWM control signal according to the reference offset and the grayscale signal, and respectively driving the plurality of constant-current driving circuits 40 to output different constant current to drive a light bar 50 of a corresponding region.

Further, the operation of acquiring brightness information of each region of a display screen 10 through the offset calculation module 20, calculating a reference offset of each region including:

the image processing MCU 60 respectively outputs a first grayscale signal to each constant-current driving circuit 40; the offset calculation module acquires a brightness value of each region of the display screen 10, calculates an intermediate value of the brightness values; the offset calculation module 20 calculates an offset corresponding to the first grayscale signal according to the intermediate value, and calculates a reference offset of each region according to the offset.

Further, the operation of calculating a reference offset of each region according to the offset including:

the offset calculation module 20 acquires a duty ratio of a PWM control signal corresponding to the first grayscale signal, an actual value of the regional brightness, and an intermediate value of the regional brightness; and Subtracting the intermediate value from the actual value of the regional brightness, then dividing the subtracting result by the actual value of the regional brightness, then multiplying the dividing result by the duty ratio of the PWM control signal to obtain an offset of the first grayscale signal, and dividing the offset by a grayscale to obtain a reference offset.

Further, the operation of reading the reference offset in the memory 70 by the constant-current driving and controlling module, converting into a multi-channel PWM control signal according to the reference offset and the grayscale signal, and respectively driving the plurality of constant-current driving circuits 40 to output different constant current to drive a light bar 50 of a corresponding region and light the display screen 10 including:

the image processing MCU 60 outputs image data to the display screen 10, and simultaneously outputs grayscale signals of each region to the constant-current driving and controlling module 30;

the constant-current driving and controlling module 30 calculates a PWM value according to the grayscale signals, then reads the reference offset, multiplies the reference offset and the grayscale value corresponding to the grayscale signal to obtain a grayscale offset of a corresponding region, adds the grayscale offset to the PWM value to obtain a final PWM control value of the corresponding region, and the constant-current controlling circuit outputs a corresponding constant-current driving current according to the final PWM control value to drive the light bar 50 to emit light.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. An HDR television, the HDR television comprising a display screen, an offset calculation module, a constant-current driving and controlling module, a plurality of constant-current driving circuits, a plurality of light bars, an image processing MCU, and a memory; the display screen being divided into a plurality of regions, and the plurality of light bars being respectively distributed in the plurality of display screen regions; wherein, the image processing MCU is configured to output a grayscale signal;

the offset calculation module is configured to acquire brightness information of each region of the display screen, calculate a reference offset of each region according to the brightness information of each region, and store the reference offset in the memory;

the constant-current driving and controlling module is configured to read the reference offset in the memory, convert into a multi-channel PWM control signal according to the reference offset and the grayscale signal, and respectively drive the plurality of constant-current driving circuits to output different constant current to drive the light bar of the corresponding region.

2. The HDR television of claim 1, wherein the image processing MCU respectively outputs a first grayscale signal to each constant-current driving circuit; the offset calculation module acquires a brightness value of each region of the display screen, calculates an intermediate value of the brightness values, calculates an offset corresponding to the first grayscale signal according to the intermediate value, and calculates a reference offset of each region according to the offset.

3. The HDR television of claim 2, wherein the first grayscale signal is a grayscale signal corresponding to the maximum grayscale.

4. The HDR television of claim 3, wherein the offset calculation module acquires a duty ratio of a PWM control signal corresponding to the first grayscale signal, an actual value of the regional brightness, and an intermediate value of the regional brightness;

subtracts the intermediate value from the actual value of the regional brightness, divides the subtracting result by the actual value of the regional brightness, then multiplies the dividing result by the duty ratio of the PWM control signal, to obtain an offset of the first grayscale signal; and divides the offset by the grayscale to obtain a reference offset.

5. The HDR television of claim 4, wherein the image processing MCU outputs image data to the display screen, and simultaneously outputs gray signals of respective regions to the constant-current driving and controlling module;

the constant-current driving and controlling module calculates the PWM value according to the gray signals, then reads the reference offset, multiplies the reference offset by the gray value corresponding to the gray signal to obtain the gray scale offset of the corresponding region, and add the gray scale offset to the PWM value to obtain a final PWM control value of the corresponding region, and the constant-current control circuit outputs a corresponding constant-current drive current according to the final PWM control value to drive the light bar to emit light.

6. The HDR television of claim 1, wherein the offset calculation module is integrated in the image processing MCU.

7. A method for regionally dimming, wherein the method comprises:

outputting a grayscale signal through an image processing MCU;

acquiring brightness information of each region of a display screen through an offset calculation module; calculating a reference offset of each region according to the brightness information of the each region; storing the reference offset in the memory; and reading the reference offset in the memory by an constant-current driving and controlling module, converting into a multi-channel PWM control signal according to the reference offset and the grayscale signal, and respectively driving the plurality of constant-current driving circuits to output different constant-current to drive a light bar of a corresponding region.

8. The method of claim 7, wherein the operation of acquiring brightness information of each region of a display screen through the offset calculation module, calculating a reference offset of each region according to the brightness information of the each region, comprises:

the image processing MCU respectively outputs a first grayscale signal to each constant-current driving circuit; the offset calculation module acquires brightness values of each region of a display screen, and calculates an intermediate value of the brightness values; and calculates an offset corresponding to the first grayscale signal according to the intermediate value, and calculates a reference offset of each region according to the offset.

9. The method of claim 8, wherein the operation of calculating a reference offset of each region according to the offset comprises:

the offset calculation module acquires a duty ratio of a PWM control signal corresponding to the first grayscale signal, an actual value of the regional brightness, and an intermediate value of the regional brightness; and subtracting the intermediate value from the actual value of the regional brightness, then dividing the subtracting result by the actual value of the regional brightness, then multiplying the dividing result by the duty ratio of the PWM control signal to obtain an offset of the first grayscale signal, and dividing the offset by a grayscale to obtain a reference offset.

10. The method of claim 9, wherein the operation of reading the reference offset in the memory by the constant-current driving and controlling module, converting into a multi-channel PWM control signal according to the reference offset and the grayscale signal, and respectively driving the plurality of constant-current driving circuits to output different constant-current to drive a light bar of a corresponding region, comprises:

the image processing MCU outputs image data to the display screen, and simultaneously outputs grayscale signals of each region to the constant-current driving and controlling module; and the constant-current driving and controlling module calculates a PWM value according to the grayscale signals, then reads the reference offset, multiplies the reference offset and the grayscale value corresponding to the grayscale signal to obtain a grayscale offset of a corresponding region, adds the grayscale offset to the PWM value to obtain a final PWM control value of the corresponding region, and the constant-current controlling circuit outputs a corresponding constant-current driving current according to the final PWM control value to drive the light bar to emit light.

11. The method of claim 7, wherein the first grayscale signal is a grayscale signal corresponding to the maximum grayscale.

12. The method of claim 7, wherein the offset calculation module is integrated in the image processing MCU.

* * * * *